United States Patent
Kelly et al.

(10) Patent No.: US 9,221,709 B2
(45) Date of Patent: Dec. 29, 2015

(54) APPARATUS FOR PRODUCING A VITREOUS INNER LAYER ON A FUSED SILICA BODY, AND METHOD OF OPERATING SAME

(75) Inventors: Allen L. Kelly, Dallas, TX (US); Christopher K. Solecki, Allen, TX (US); Kevin M. Chapla, Melissa, TX (US); William C. Strauss, Westford, MA (US)

(73) Assignee: RAYTHEON COMPANY, Waltham, MA (US)

( * ) Notice: Subject to any disclaimer, the term of this patent is extended or adjusted under 35 U.S.C. 154(b) by 68 days.

(21) Appl. No.: 13/076,938

(22) Filed: Mar. 31, 2011

(65) Prior Publication Data

US 2012/0247151 A1 Oct. 4, 2012

(51) Int. Cl.
- C03B 20/00 (2006.01)
- C03B 19/09 (2006.01)
- C03B 29/02 (2006.01)
- C03C 3/06 (2006.01)

(52) U.S. Cl.
CPC .. *C03B 29/02* (2013.01); *C03C 3/06* (2013.01)

(58) Field of Classification Search
CPC ...... C03B 19/095; C03B 20/00; C03B 15/10; C03B 35/002; C03B 35/00
USPC ......................... 65/17.3–17.4, 17.6
See application file for complete search history.

(56) References Cited

U.S. PATENT DOCUMENTS

| | | | |
|---|---|---|---|
| 2,270,718 A | 1/1942 | Skaupy et al. | |
| 2,507,433 A | 5/1950 | Borchert et al. | |
| 3,582,287 A * | 6/1971 | Capita | 17/214 |
| 3,811,857 A | 5/1974 | Deeg et al. | |
| 4,338,114 A | 7/1982 | Brockway et al. | |
| 4,440,558 A * | 4/1984 | Nath et al. | 65/391 |
| 4,565,711 A * | 1/1986 | Pinkhasov | 427/589 |
| 4,949,095 A | 8/1990 | Neil et al. | |

(Continued)

FOREIGN PATENT DOCUMENTS

| | | |
|---|---|---|
| CN | 101988214 | 3/2011 |
| EP | 2 226 300 A1 | 9/2010 |

(Continued)

OTHER PUBLICATIONS

CNC USB Controller, PlanetCNC as viewed at http://web.archive.org/web/20100117181238/http://www.planet-cnc.com/ dated back to Jan. 17, 2010 and viewed on Aug. 16, 2012.*

(Continued)

*Primary Examiner* — Jodi C Franklin
(74) *Attorney, Agent, or Firm* — Christie, Parker & Hale, LLP

(57) ABSTRACT

An apparatus for producing a layer of vitreous silica adjacent at least a portion of an inner surface of a fused silica body is described, comprising a heat source disposed to apply sufficient heat to at least a portion of the inner surface to cause a layer of said at least a portion of the inner surface to vitrify. In certain embodiments the heat source is configured to heat at one time a relatively small area of the inner surface, and the apparatus comprises a positioning mechanism for moving the heat source with respect to the inner surface. In certain embodiments the heat source is a hydrogen-oxygen surface-mix fueled torch that is moved helically with respect to the inner surface of the body under the control of a programmed CNC motion control system.

12 Claims, 5 Drawing Sheets

(56) References Cited

U.S. PATENT DOCUMENTS

| | | | | |
|---|---|---|---|---|
| 4,956,208 | A * | 9/1990 | Uchikawa et al. | 428/34.6 |
| 5,028,407 | A * | 7/1991 | Chieng et al. | 423/338 |
| 5,259,861 | A * | 11/1993 | Yeh et al. | 75/334 |
| 5,497,004 | A | 3/1996 | Rudolph et al. | |
| 5,692,087 | A * | 11/1997 | Partus et al. | 385/123 |
| 5,736,206 | A | 4/1998 | Englisch et al. | |
| 5,958,133 | A * | 9/1999 | Boulaev | 117/208 |
| 6,091,375 | A | 7/2000 | Goto et al. | |
| 6,402,834 | B1 * | 6/2002 | Nagai et al. | 117/13 |
| 6,405,563 | B1 | 6/2002 | Nagata et al. | |
| 6,462,891 | B1 * | 10/2002 | Fukumoto et al. | 359/742 |
| 7,118,789 | B2 * | 10/2006 | Kemmochi et al. | 428/34.6 |
| 7,299,658 | B2 * | 11/2007 | Ohama et al. | 65/374.11 |
| 7,305,852 | B2 | 12/2007 | Gotoh et al. | |
| 8,240,169 | B2 * | 8/2012 | Fukui et al. | 65/144 |
| 2001/0032580 | A1 * | 10/2001 | Phillips et al. | 117/13 |
| 2002/0170316 | A1 | 11/2002 | Leist et al. | |
| 2003/0104920 | A1 * | 6/2003 | Schwertfeger et al. | 501/54 |
| 2004/0050099 | A1 | 3/2004 | Fukui et al. | |
| 2004/0237588 | A1 | 12/2004 | Schwertfeger et al. | |
| 2006/0177787 | A1 * | 8/2006 | Mizuno et al. | 431/345 |
| 2009/0084308 | A1 * | 4/2009 | Kishi et al. | 117/13 |
| 2009/0277223 | A1 * | 11/2009 | Kayser et al. | 65/33.9 |
| 2010/0000465 | A1 * | 1/2010 | Kishi et al. | 117/208 |
| 2010/0005836 | A1 * | 1/2010 | Kishi et al. | 65/124 |
| 2010/0071613 | A1 * | 3/2010 | Kishi et al. | 117/208 |
| 2010/0107691 | A1 | 5/2010 | Sato et al. | |
| 2010/0139549 | A1 * | 6/2010 | Sakurada et al. | 117/13 |
| 2010/0229599 | A1 * | 9/2010 | Fujita et al. | 65/33.9 |
| 2010/0244311 | A1 | 9/2010 | Kishi et al. | |
| 2011/0079047 | A1 * | 4/2011 | Suzuki et al. | 65/29.13 |
| 2011/0197631 | A1 * | 8/2011 | Sudo et al. | 65/17.4 |
| 2011/0240663 | A1 * | 10/2011 | Yamagata et al. | 220/660 |
| 2011/0256329 | A1 | 10/2011 | Thomas et al. | |
| 2011/0295405 | A1 * | 12/2011 | Sudo et al. | 700/104 |
| 2012/0131954 | A1 | 5/2012 | Sudo et al. | |
| 2012/0167625 | A1 * | 7/2012 | Sudo et al. | 65/17.3 |
| 2012/0167628 | A1 * | 7/2012 | Sudo et al. | 65/29.1 |
| 2012/0181164 | A1 * | 7/2012 | Ookubo et al. | 204/164 |

FOREIGN PATENT DOCUMENTS

| | | |
|---|---|---|
| ES | 2 041 587 A2 | 11/1993 |
| JP | 62-257805 | 11/1987 |
| JP | 09-506324 | 6/1997 |
| JP | 09-506324 A | 6/1997 |
| JP | 11-011956 | 1/1999 |
| JP | 2001-342030 | 12/2001 |
| JP | 2001-342030 A | 12/2001 |
| JP | 2003313035 A * | 11/2003 |
| JP | 2006-273666 A | 12/2006 |
| JP | 2008-081375 A | 4/2008 |
| JP | 2008-528813 A | 7/2008 |
| KR | 10-2004-0103775 | 12/2004 |
| TW | 201016622 A | 5/2010 |
| WO | WO 95/13248 A1 | 5/1995 |
| WO | WO 2007/084144 A2 | 7/2007 |
| WO | WO 2011/019014 A1 | 2/2011 |

OTHER PUBLICATIONS

Fukui JP2001342030 machine translation provided by:http://translationportal.epo.org/emtp/translate?ACTION=description-retrieval&COUNTRY=JP&ENGINE=google&FORMAT=docdb&KIND=a&LOCALE=en_EP&NUMBER=2001342030&OPS=jp.espacenet.com/ops&SRCLANG=ja&TRGLANG=en&PDF=true on Jul. 28, 2014.*
"Ceramic Systems for Missile Structural Applications," Engineering Experiment Station Georgia Institute of Technology, Prepared under Navy, Bureau of Naval Weapons, Contract NOw-63/0143-d, Summary Report No. 1, (Quarterly Report No. 4 Inclusive), Nov. 1, 1962 through Oct. 31, 1963, Atlanta, Georgia, 47 pages.
Korean Office action mailed Sep. 27, 2013 for Korean Application No. 10-2012-0009538, filed Jan. 31, 2012 Applicant Raytheon Company, Office action mailed Sep. 27, 2013 (4 pgs.).
English language translation of Korean Office action mailed Sep. 27, 2013 for Korean Application No. 10-2012-0009538, filed Jan. 31, 2012 Applicant Raytheon Company, Office action mailed Sep. 27, 2013 (3 pgs.).
Extended European Search Report for European Application No, 12153069.5, Filed Jan. 30, 2012, Extended European Search Report dated Jul. 11, 2013 and mailed Jul. 18, 2013 (8 pgs.).
Office Action for Japan Application No. 2012-016918, Filed Jan. 30, 2012, Japan Office Action mailed Jul. 30, 3013 (3 pgs.).
English Translation of Office Action for Japan Application No. 2012-016918, Filed Jan. 30, 2012, Japan Office Action mailed Jul. 30, 2013 (4 pgs.).
Japan Decision of Rejection mailed Nov. 26, 2013 for corresponding Japan Application No. 2012-016918, filed Jan. 30, 2012 and published Nov. 8, 2012 under Publication No. 2012-214357 with English translation (4 pages.).
Taiwan Office action mailed Dec. 3, 2013 for corresponding Taiwan Application No. 101102852, filed Jan. 30, 2012 and published Oct. 1, 2012 under Publication No. 201238925 with partial English translation (7 pages).
European Search Report mailed Jul. 18, 2013 in co-related European Application No. 12 153 103.2, filed Jan. 30, 2012, published Oct. 3, 2012, Publication No. 2,505,565 (6 pages).
Japan Office action mailed Jul. 30, 2013 in co-related Japan Application No. 2012-0169020, filed Jan. 30, 2012, published Nov. 8, 2012, Publication No. 2012-214358 (3 pages).
English translation of First Office Action issued on Jul. 30, 2013 in co-related Japan Application No. 2012-016920 (4 pages).
Japan Decision of Rejection mailed Nov. 26, 2013 in co-related Japan Application No. 2012-0169020, filed Jan. 30, 2012, published Nov. 8, 2012, Publication No. 2012-214358 with English translation (4 pages).
Korean Preliminary Rejection mailed Jun. 27, 2013 in co-related Korean Application No. 10-2012-0009543, filed Jan. 31, 2012 (5 pages).
English language translation of Korean Office action for co-related Korean Application No. 10-2012-0009543, filed Jan. 31, 2012, Office action dated Jun. 27, 2013 (4 pages).
Taiwan Office action mailed Nov. 21, 2013 in co-related Taiwan Application No. 101102848, filed Jan. 30, 2012, published Oct. 1, 2012, Publication No. 201238917 (6 pages).

* cited by examiner

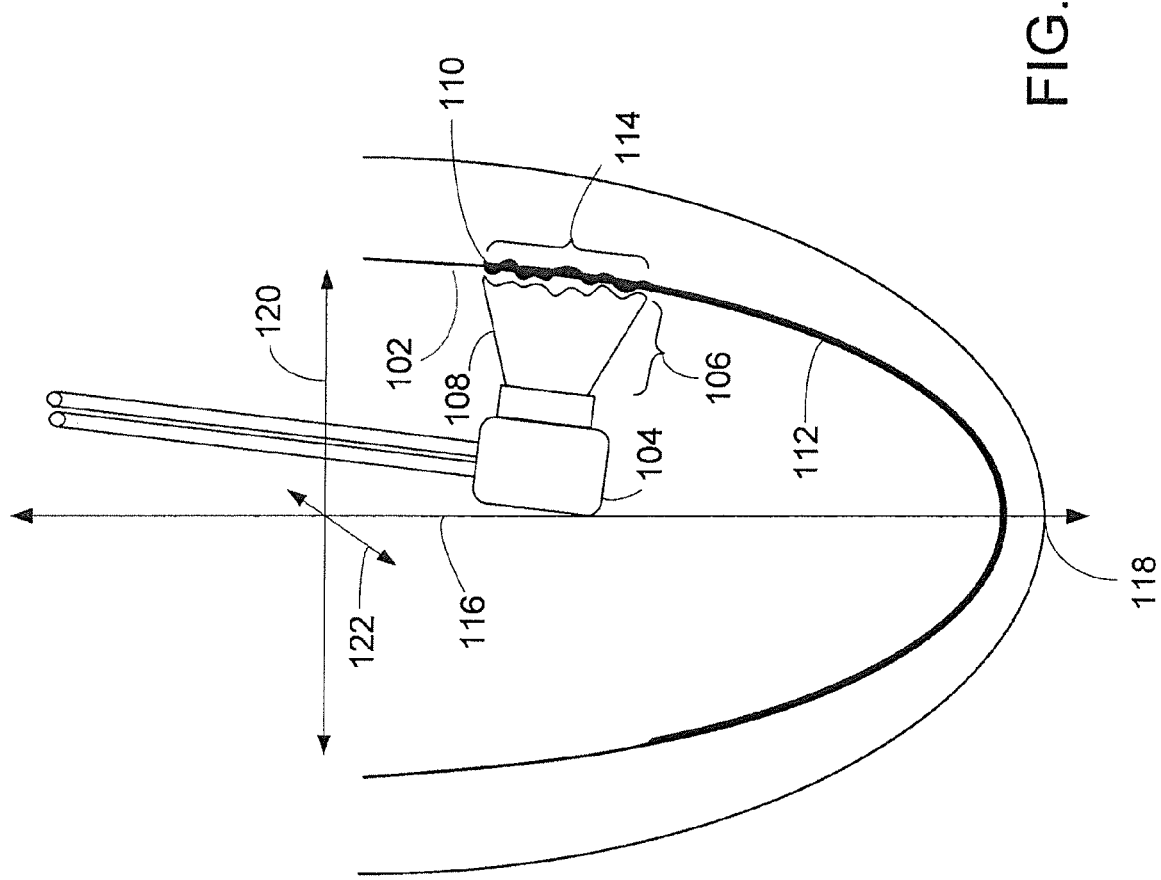

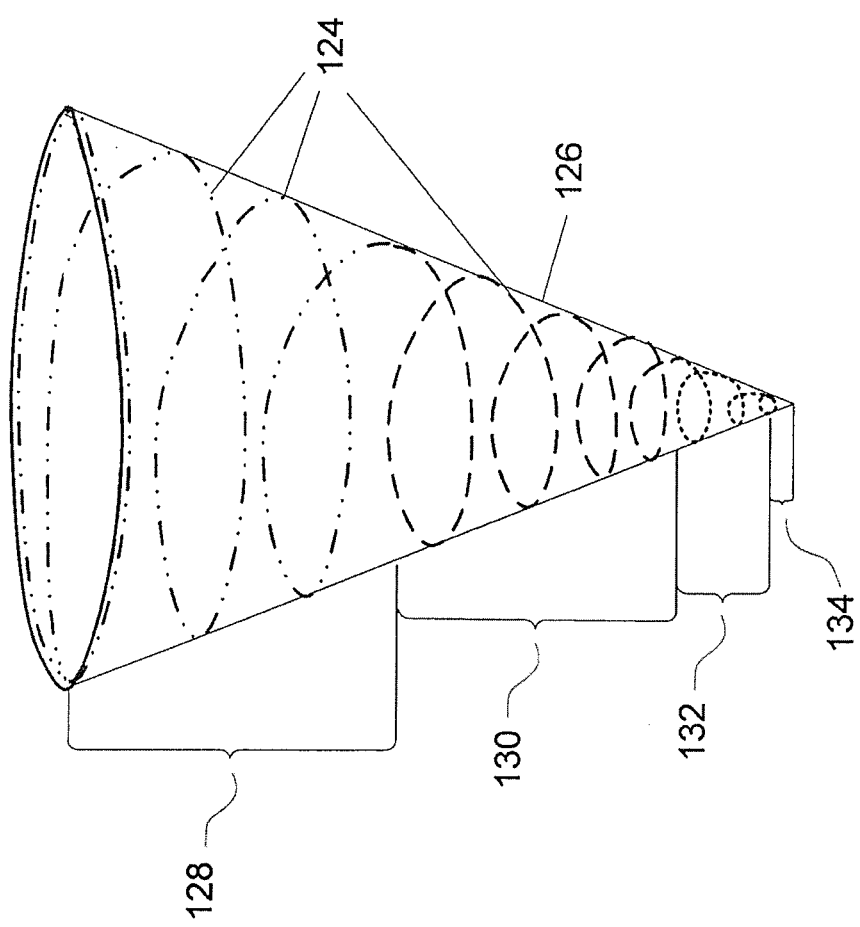

APPARATUS FOR PRODUCING A VITREOUS INNER LAYER ON A FUSED SILICA BODY, AND METHOD OF OPERATING SAME

STATEMENT REGARDING FEDERALLY SPONSORED RESEARCH

This invention disclosure is related to Government contract number 5BRS290608700. The U.S. Government has certain rights in this invention.

BACKGROUND OF THE INVENTION

A fused silica ceramic body is practical and advantageous for a number of diverse applications. Such a body is rendered all the more useful by the autogenic generation of a thin vitrified silica layer on an inner surface of such a body to prevent moisture and other fluids from penetrating through the wall of the body. Optimal performance of such a fused silica body with a vitrified layer requires that the vitrified layer be relatively thin, uniform, and of constant thickness within a relatively tight tolerance. The desired consistency of layer properties over the entire layer and repeatability over different production units of such a body would be expensive and difficult to achieve with a manual vitrification process.

SUMMARY OF THE INVENTION

The desired level of uniformity in the production of a fused silica body with a vitrified silica layer can be achieved by using an accurate and repeatable automated apparatus. Such an apparatus in accord with certain embodiments of the present invention performs all the necessary processes to create a thin, uniform vitrified silica layer on an inner surface, edge, and/or other surfaces of a fused silica body in a controlled, repeatable manner without compromising the desired properties of the body and the layer.

According to certain embodiments, the present invention is directed to an apparatus for producing a layer of vitreous silica adjacent at least a portion of an inner surface of a fused silica body, the apparatus comprising a heat source disposed to apply sufficient heat to at least a portion of the inner surface to cause a layer of said at least a portion of the inner surface to vitrify. In certain of those embodiments, the heat source is configured to heat at one time a relatively small area of the inner surface, and the apparatus comprises a positioning mechanism for moving the heat source with respect to the inner surface, in certain of those embodiments, the heat source comprises at least one torch, and in certain of those embodiments, the torch is a surface mix, low-velocity, oxygen-hydrogen fueled torch.

In certain embodiments, the torch is constructed of quartz glass. In certain embodiments, a pattern of emanating heat from a torch is longer in one direction than in another direction and the longer direction is disposed transversely to a direction of movement of the torch. In another embodiment, the flow of at least one gas feeding the torch is regulated by a mass flow controller. In another embodiment, at least one positioning mechanism is a CNC motion controller, and the apparatus comprises a computing device causing the motion controller to move the heat source with respect to the inner surface in a predefined manner. In another embodiment, the apparatus comprises a kiln configured to heat at least of portion of the fused silica body and positioned to permit positioning the heat source adjacent the inner surface. In another embodiment, the apparatus comprises an oven configured to anneal the fused silica body. In another embodiment, at least one positioning mechanism is capable of translating the heat source relative to the body along an axis of rotation of the body. In another embodiment, at least one positioning mechanism is capable of revolving the heat source relative to the body around an axis of rotation of the body. In another embodiment, at least one positioning mechanism is capable of rotating the heat source relative to the body around an axis orthogonal to an axis of rotation of the body. In another embodiment, the apparatus comprises a positioning mechanism capable of rotating the body. In another embodiment, the apparatus comprises a plurality of torches each usable to produce at least a portion of the layer of vitreous silica on the body.

According to certain embodiments, the present invention is directed to a method for operating an apparatus to produce a layer of vitreous silica adjacent at least a portion of an inner surface of a fused silica body, the method comprising causing a motion controller to move at least one ignited torch over at least a portion of an inner surface of a fused silica body in close enough proximity with sufficient heat to cause a portion of the inner surface to vitrify. In certain of those embodiments, the method comprises causing at least one motion controller to move at least one ignited torch so as to maintain a constant standoff distance from a point on the inner surface nearest the torch. In certain embodiments, the method comprises causing at least one motion controller to move at least one torch helically relative to at least a portion of the inner surface, in certain of those embodiments the method comprises placing the fused silica body in a kiln; positioning the kiln to permit the motion controller to position at least one torch adjacent the inner surface; heating the kiln to a temperature lower than a temperature causing vitrification; and maintaining the kiln above room temperature while at least one torch moves relatively over at least a portion of the inner surface; in certain of those embodiments the method comprises causing a motion controller to rotate the body within the kiln and causing a motion controller to translate the at least one torch along an axis of rotation of the body; in certain of those embodiments, the method comprises causing a motion controller to vary the rotational speed of the fused silica body within the kiln. In another embodiment, the method comprises causing at least one motion controller to execute a series of preset commands in moving at least one ignited torch relative to the body. In another embodiment, the method comprises causing a motion controller to translate at least one torch relative to the body along a radial axis to position the torch at at least one desired standoff distance from the inner surface. In another embodiment, the method comprises causing a motion controller to rotate at least one torch relative to the body around a tangential axis so as to, in a plane defined by an axis of rotation of the piece and a radial axis, dispose the flame emanating from the torch to be normal to a point on the inner surface nearest the torch. In another embodiment, the method comprises causing at least one motion controller to move a first torch relative to the body over a first portion of the inner surface; enabling a second torch to have its motion relative to the body controlled by the motion controller; and causing the motion controller to move the second torch relative to the body over a second portion of the inner surface. In another embodiment, the method comprises causing either the kiln or another oven to anneal the fused silica body.

BRIEF DESCRIPTION OF THE DRAWINGS

FIG. 1A is a cutaway side view of a torch moving within a fused silica body and vitrifying its inner surface.

FIG. 1B is a transparent side view schematic depiction of a helical path followed by multiple area heat sources moving within a fused silica body and vitrifying its inner surface.

DETAILED DESCRIPTION

Figure 2:
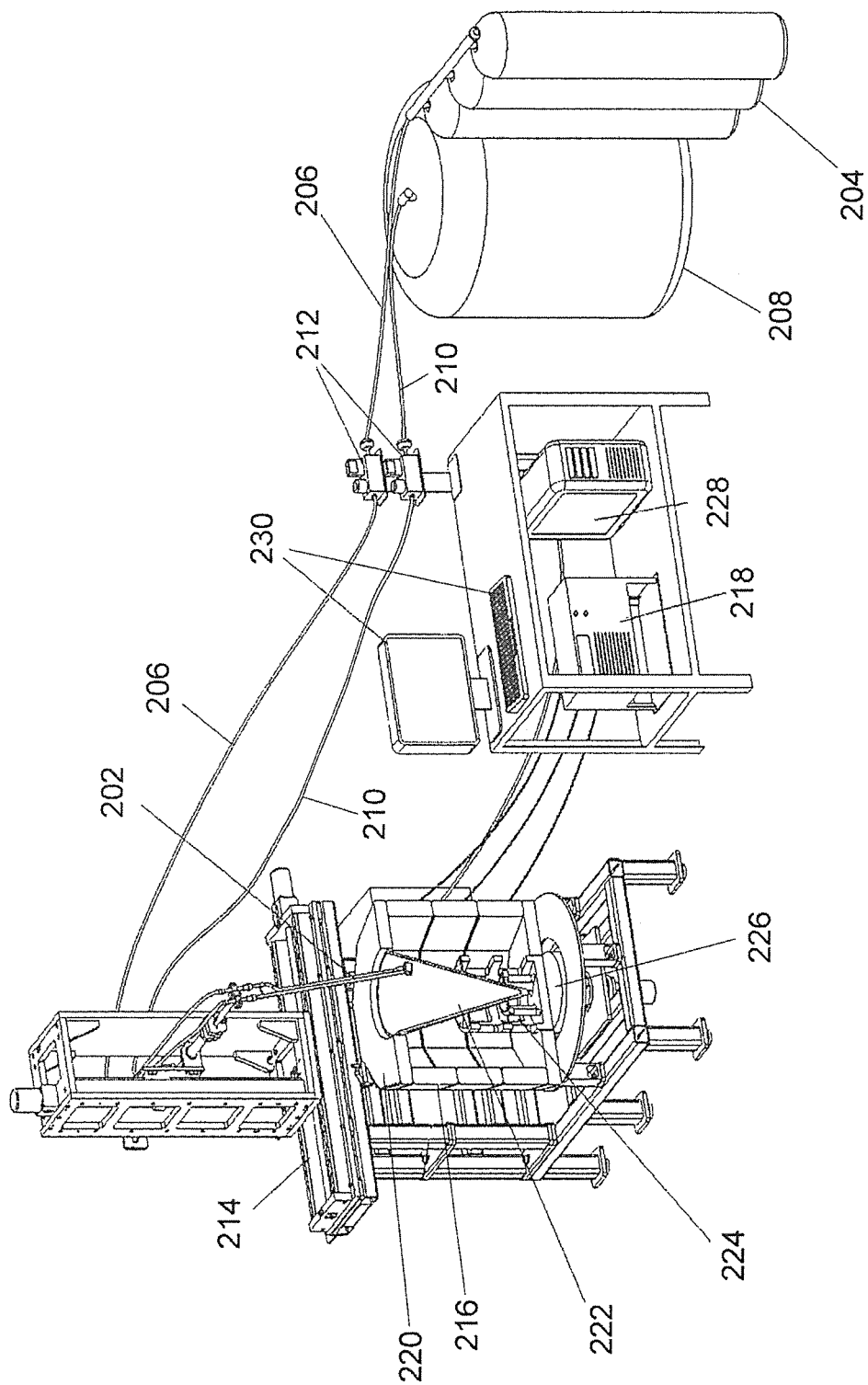
FIG. 2 is a diagram of an apparatus usable to create a vitrified layer on an inner surface of a fused silica body.

The apparatus and methods of embodiments in accord with the present invention are directed to manufacturing a fused silica body with a vitreous silica layer on at least part of an inner surface, advantageous for applications such as aerospace and pharmaceuticals. Such a body, along with methods for its manufacture, is further and more specifically described in a co-pending patent application entitled "FUSED SILICA BODY WITH VITREOUS SILICA INNER LAYER, AND METHOD FOR MAKING SAME", Application No. 13/077015, filed Mar. 31, 2011, now U.S. Patent No. 9,193,620, the entire content of which is incorporated herein by this reference.

As described in the above-referenced co-pending application and as depicted in FIG. 1A, a preferred method for creating a vitreous silica layer on an inner surface of a fused silica body, or piece, 102 is to pass a superheating local area heat source, such as a torch 104, over desired portions of the piece at a standoff distance 106. The heat or flame 108 from the torch vitrifies the layer in the areas over which it passes, autogenically producing a uniform, relatively thin vitreous layer from the fused silica body itself. The surface 110 melts as the torch approaches, and then cools and re-solidifies as vitreous silica layer 112 after the torch passes. In a preferred embodiment, the torch has a linear rather than point flame, with a melt width 114.

For ease in discussing the motion of the area heat source relative to the piece, three arbitrary orthogonal axes, as depicted in FIG. 1A, are defined here. The first axis is the axis of rotation 116 of the piece, which runs through the leading tip 118 of a symmetrical piece and through the center of the aft cavity opening opposite the tip. In embodiments of the present invention that involve rotation of the piece during processing, the piece is rotated approximately around its axis of rotation. The shape of the piece being processed typically approximates a surface of revolution about this axis, with the cavity to be processed also being roughly symmetrical about this axis. However, the piece may not be a true or precise surface of revolution, as the piece and/or the cavity may feature irregular structures, shelves, or indentations. The other two axes are defined with respect to the heat source rather than any particular point on the piece, since in some embodiments the piece is rotating and consequently it is easier to describe the motion of the heat source in terms of axes that remain stable with respect to that heat source. Accordingly, the second axis is the radial axis 120, which is normal to the axis of rotation and extends from the axis of rotation in the direction of the area heat source. The third axis is the tangential axis 122, which is normal to the other two axes defined here, and generally runs tangent to the surface of the piece at the point closest to the area heat source. For further ease in discussing the positioning and motion of the area heat source and the piece, the concepts of upwards and downwards are used here, as though the piece were positioned with its tip facing down and its aft edge or cavity opening facing up. These are used only for convenient reference, however, and while in one preferred embodiment the piece is processed in that orientation, other embodiments of the present invention do not require the piece be processed in that physical orientation or the orientations shown in the drawing figures.

In another preferred embodiment, as described in the above-referenced co-pending application and as depicted in FIG. 1B, the path followed by the heat source is a helical rastering 124 over the inner surface of the piece 126, which path is very efficient for creating the layer on a concave or conical inner surface. (For clarity and simplicity of depiction, certain aspects and features in accord with embodiments of the present invention, such as closely positioned, overlapping swaths and flat beginning and ending swaths are not shown in FIG. 1B.) One way of achieving such a helical motion is to rotate the piece while translating the heat source such as a torch along the axis of rotation of the piece, and also translating the torch along a radial axis as necessary to maintain a constant stand-off distance between the torch and the various portions of the surface at different distances from the piece's axis of rotation. As discussed herein, different torches may be used to process various portions of the piece, such as those depicted as 128, 130, and 132 in FIG. 1B. There may also be a portion of the piece, such as that depicted as 134 in FIG. 1B, in which the inner surface is not to be vitrified.

Certain embodiments of the present invention comprise apparatus for vitrifying at least portions of the inner layer of the fused silica body, creating the inner vitreous silica layer autogenically. Such apparatus may make use of several commercially available components. Such apparatus may supply all the processes necessary for processing a fused silica body or piece, including superheating local areas of the inner layer, producing helical relative motion between the heat source and the piece, bias heating of the piece during the local superheating process to avoid thermal shock, and annealing of the piece afterward to relieve any stresses in the piece.

In an embodiment in accord with the present invention, as depicted in FIG. 2, the apparatus comprises, for its superheating heat source, a torch 202 mounted on a boom long enough to permit the torch to reach those areas of the piece, as mounted in a kiln, with which that particular torch is used. A linear heat source is preferably implemented using a torch producing a linear flame jet, or less preferably a torch with a linear arrangement of point flame jets. For purposes of chemical purity of the flame and resistance to the superheated environment to which the torch is exposed during the vitrification process, such torch is preferably constructed entirely from quartz glass, although a metal torch may be used. In a preferred embodiment, the torch is a low velocity, surface mix unit.

In a preferred embodiment, the torch uses hydrogen as fuel, supplied from industry standard tank(s) or bottle(s) 204 and supply lines 206, and oxygen as oxidizer, supplied from industry standard tank(s) or bottle(s) 208 and supply lines 210. The use of hydrogen is advantageous over other fuels, such as organic compounds, for a number of reasons. Its flame burns in the 2600-2800° C. range, which is optimal for rendering viscous a thin surface layer of silica. Hydrogen use prevents carbon contamination of the vitrified surface, and fosters a lower flame velocity which minimizes surface deformation. Surface-mix technology for hydrogen torches is readily available, hydrogen requires less total oxygen, and the favorable stoichiometry of hydrogen and oxygen as reactants permits a relatively relaxed tolerance of gas mixture. However, other fuel and oxidizer gasses or even other torch types, such as arc-plasma, may be usable.

During the vitrification process the torch consumes a large amount of gas, and significant loss of pressure during the process may render the piece unsalvageable. Therefore, to supply the torch with sufficient volumes of gas with minimal pressure drop, a large tank of liquid oxygen may be used along with multiple bottles of hydrogen plumbed together via an off-the-shelf manifold system. The pressure of both gases are typically initially regulated to 50 pounds per square inch prior to their flow rates being further regulated more precisely using off-the-shelf electronic mass flow controllers 212. Typically the flow controllers for oxygen operate in the range of 1 to 100 standard liters per minute, and the flow controllers for hydrogen operate in the range of 2.5 to 250 standard liters per minute, at a maximum pressure of 125 pounds per square inch. The gas flow rates may be controlled via a simple graphical user interface supplied by the flow controller manufacturer, or they may be controlled by and coordinated with the program that directs the movement of the torch over the surface of the piece. The gas flow rates may be adjusted or varied to assist in generating the desired heat output of the particular torch being used.

In one embodiment, the flame torch is mounted on a CNC motion controller 214, which imparts multiple degrees of translational and rotational freedom to the torch. The motion controller permits the flame to be translated and rotated in several dimensions in relation to the piece being processed. Typically this may be a standard, off-the-shelf CNC motion controller product. The motion controller may use an "open-loop" stepper motor system for translation movement, with stepper motors typically capable of delivering at least 1000 ounce-inches of torque and resolving 2000 steps per revolution, and with translation rates between 0 and 300 inches per minute. In one embodiment, the translation motors permit the translation of the area heat source at least along the radial axis and tangential axis. Drive motors for rotational movement may typically resolve 20,000 steps per revolution, with rotation rates between 0 and 3000 degrees per minute.

Not every translational and rotational degree of freedom potentially available with CNC motion control needs to be driven by motors or actuators under computer control. Typically where an off-the-shelf four-axis CNC motion control system is used, two translational axes are employed, one for translation of the torch along the axis of rotation and one for translation of the torch along the radial axis, and two rotational axes are employed, one for rotation of the torch about the tangential axis and one for rotation of the piece around the axis of rotation. In such an embodiment, the orientations of the torch around an axis parallel to the axis of rotation and around the radial axis are typically set by fixable adjustments.

In an embodiment of the present invention, the bias heating and annealing of the piece are provided by a kiln 216. Optionally, the annealing may be performed in an oven other than the kiln. The kiln may be a standard off-the-shelf top loading kiln. Optimally the kiln is capable of producing a quick thermal ramp-up and delivering an environmental temperature for the entire piece in a range from room temperature to about 1200° C. The kiln parameters such as temperature set point and heating and cooling ramp rate, etc. may be controlled by kiln controller 218. This may be a standard, off-the-shelf controller, and may be controlled by a standard program from the controller manufacturer that features a graphical user interface. Alternatively, these parameters may be controlled by and coordinated with the program that directs the movement of the torch over the surface of the piece.

The kiln typically features a removable kiln cover 220. Two different kiln covers are typically used, one with an opening to allow the torch access to the piece during the vitrifying passes of the torch over the piece, and one with no opening which is used during preheat or reheat cycles to more effectively contain the heat within the kiln. In certain embodiments, a fused silica piece to be processed 222 is placed in piece holder 224 within the kiln during vitrification processing. The piece holder is a fixture that is preferably made of a refractory material with a coefficient of thermal expansion that matches the piece to be processed, or if different from the piece's coefficient of thermal expansion, is at least accounted for. In certain embodiments the piece holder is mounted on turntable 226 which rotates the piece holder and the piece during the process, thus imparting the rotational component of the helical rastering motion. The turntable is typically connected to the motion controller and its rotation programmed and driven as one of the rotational axes of the motion controller. The piece holder further serves to rotatably seal the bottom of the kiln, permitting the turntable mechanism to be placed outside the kiln in a room temperature environment. (The kiln, kiln cover, piece, piece holder, and turntable are shown in FIG. 1 in cutaway view.)

The piece rotation rate is typically between 0.2 and 6 rpm, and can be varied as desired, for example to modulate the amount of heat being delivered as the conductive surface area of the portion of the piece being superheated increases or decreases. A slower rotation allows more heat to be imparted to a particular zone being treated. More compact areas, such as the smaller-diameter regions near the point of a conical cavity, may require less application of heat. This can be achieved by passing the heat source over the area more quickly, one way of accomplishing which is to rotate the piece more quickly. As the torch is raised into the larger part of the piece's inner cavity the revolution rate can be decreased, allowing more heat to be imparted to the larger conductive surface areas involved in that area. The rotation speed typically is continuously varied in compensation when processing a piece that features a continuously increasing diameter from tip to aft edge.

In one embodiment the motion controller is controlled by computer 228 and user interface devices 230. The computer may be programmed using industry standard programming languages, such as G-Code for the controlling the motion controller, and off-the-shelf software typically featuring a graphical user interface. The computer may also be tied into the kiln controller and mass flow controllers, and indirectly or directly control their operation as well, for instance to integrate their operation more tightly to the movement of the torch along the inner surface.

Figure 3:
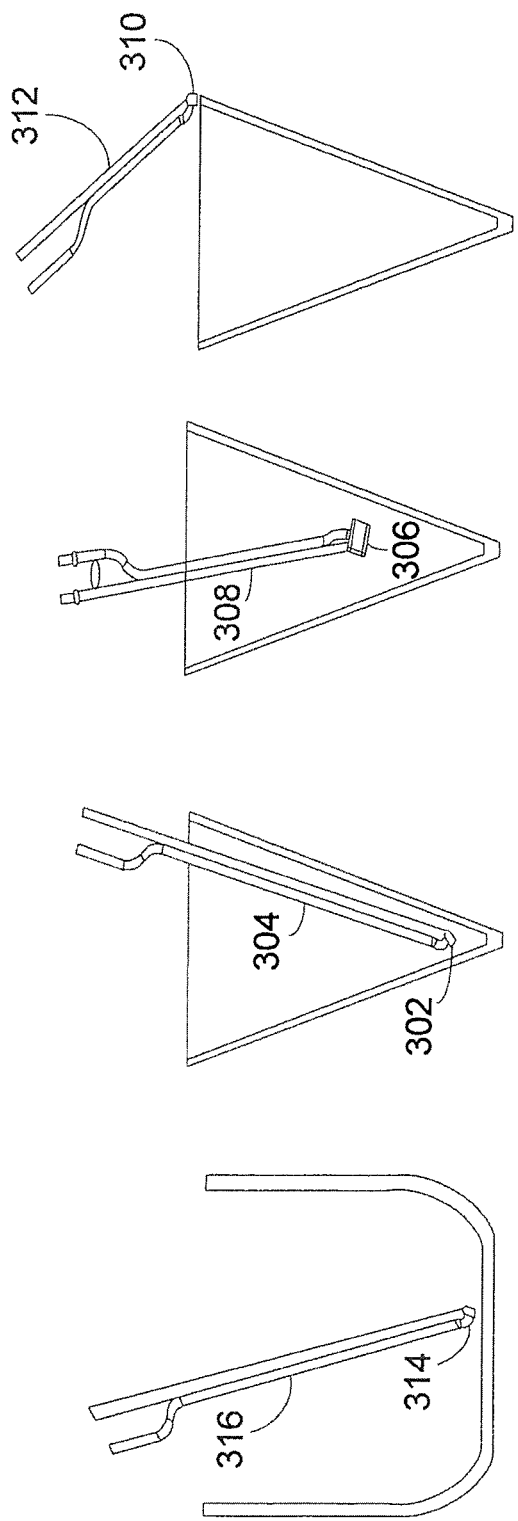
FIG. 3 is a series of cutaway side views depicting various torches usable for vitrifying different portions of a fused silica body.

Differing penetrations of the torch within the cavity may be accomplished by use of multiple torches, as depicted in FIG. 3. For example, regions near the lowest point of the cavity are farthest from the opening where the torch accesses the cavity, and are also likely to be smaller in area and in a more confined space; therefore, to avoid overheating, such regions may be vitrified with a smaller torch head 302 and a longer boom 304. Typically such a smaller torch may feature a heat output of at least 10,000 BTU per hour. Conversely, the regions nearer the opening of the cavity are larger in area and closer to the torch access point, and so the torch used for heating such regions may feature a larger torch head 306 and a shorter boom 308. Typically such a larger torch may feature a heat output of at least 100,000 BTU per hour. The aft edge of a piece typically presents a smaller surface and, in the manner in which the piece is typically oriented within the kiln, is usually located closer to the motion controller; therefore, such edge may optimally be vitrified using a smaller torch head 310 and a smaller boom 312. Where the piece being processed has a flat bottom, or is entirely flat, the vitrification of the bottom may use a torch head 314 angled to direct its flame toward the bottom and a longer boom 316. In certain embodiments the vitrification process may be interrupted and different torches manually swapped out, or multiple torches with differing boom lengths may be jointly mounted on the motion controller and automatically withdrawn and inserted as the process proceeds. The use of multiple torches typically results in different portions of the helical scan over the surface being performed by different torches, as depicted by regions 128, 130, and 132 in FIG. 1B.

The inner surface of the cavity being processed may not be a uniform cone or other surface of revolution, and may instead feature articulations and irregularities. In certain embodiments, the ability of the torch to move in and out along the radial axis permits the torch to withdraw from the surface to accommodate bumps, ledges and other irregularities. Also, additional computer-controlled degrees of freedom or articulations of the torch's movement such as rotation around the axis of rotation and/or radial axis allow the flame to turn and face "walls" emerging perpendicularly from the inner wall. If a surface irregularity increases the surface length to be scanned, the rotation of the piece may be momentarily reduced to compensate while the torch traces the perimeter of the irregularity. In some embodiments, computer numerical control permits a virtually unlimited amount of special flame angling and positioning to accommodate such irregularities during the overall generally helical scan.

Figure 4:
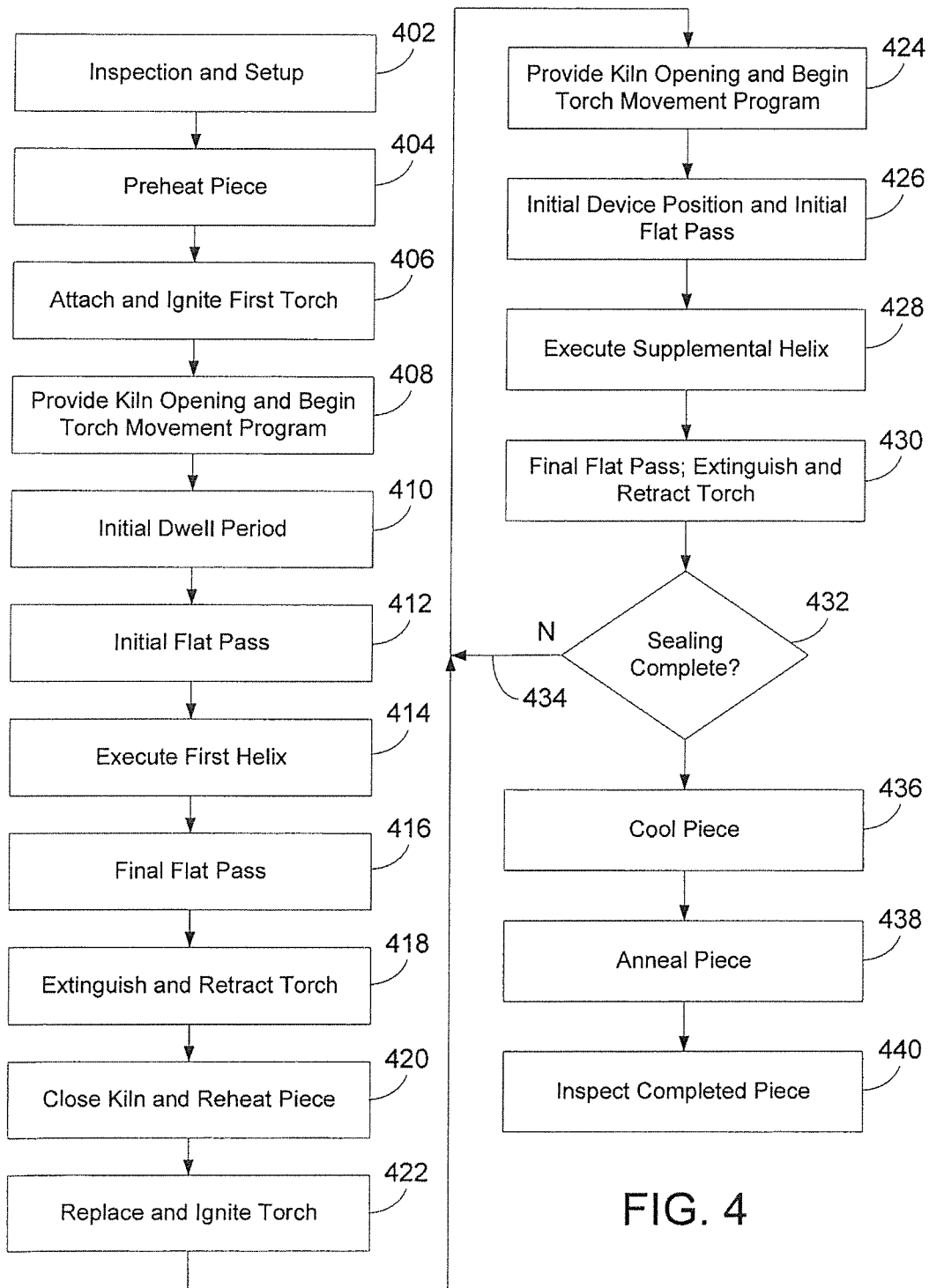
FIG. 4 is a flow chart of a method usable for operating an apparatus to create a vitrified layer on an inner surface of a fused silica body.

In a typical process in accord with an embodiment of the present invention, as depicted in FIG. 4, the piece to be processed 222 is prepared (402) for the vitrification process; typically as part of the preparation process, the piece is optically inspected and cleaned, such as with methanol, to remove any contaminants from its inner surface and aft edge, then is placed, aft-end up, into the piece holder 224 inside the kiln 216. A kiln cover with no opening is placed onto the kiln top and the kiln and piece are preheated (404), typically by running a preheat program on the kiln controller 218 or the computer 228 if configured to control the kiln controller. The temperature of the preheat, also known as bias heating, is typically between 600° C. and 1000° C.; preferably the preheat temperature should be as high as possible, so as to minimize the temperature differential between the area under the heat source and the rest of the piece, while remaining below temperature ranges that would promote undesirable crystallization in the piece. Use of the higher portion of this range decreases the risk of thermal shock, and may be had with less risk of crystallization where the torch gasses used and the silica in the piece are closer to pure. The piece is typically held at this temperature for thirty minutes or more, the exact time duration chosen depending on the thickness of piece's walls.

When the piece has been suitably preheated, the torch to be used with the forward portion of the inner surface (closest to the tip or center of the cavity, which is at the lowest point as the piece is held within the kiln) is attached to the motion controller in a single-torch system, or in a multiple-torch system this torch has been programmed to be the first to be activated; this torch is then ignited (406). The kiln cover without an opening is removed from the kiln, and a kiln cover with an opening 220 is placed over the kiln top to provide an access for the torch to the inside surface of the piece inside the kiln, and the torch movement program is initiated (408). (Alternatively, the kiln cover with the opening may be left on the kiln all the time, and a "stackable" kiln cover with no opening may be placed on top of it during those periods when no opening is desired.) The mass flow controllers, optimally under computer control, are adjusted to achieve a stoichiometric combustion of hydrogen and oxygen delivering thermal energy of at least one hundred thousand BTU per hour, although lower rates of delivery may be used in practice depending on the size of torch attached.

The torch is positioned at a standoff distance from the surface nearest the torch's location, which distance is typically held constant throughout the movement of the torch over the inner surface. The standoff distance is chosen to be of optimal size to permit the fuel and oxidizer mixture emanating from the torch to mix, combust, and achieve maximum thermal energy at the point where the flame contacts the surface. The torch is typically rotated around the tangent axis to bring the direction of the flame, in the side-view plane defined by the axis of rotation and the radial axis, normal to the point of the surface to be treated, so as to maintain an even standoff distance and impart an even distribution of heat along the length of the linear flame. While the torch could also be rotated to bring it normal to the surface in the top-view plane defined by the radial axis and the tangent axis, it is usually preferable instead to rotate the torch in the top-view plane toward the forward direction of the torch's travel, which permits preheating of the surface line or swath as it approaches the torch for vitrification. Typically the torch is rotated in the top-view plane to bring the flame to between ten and fifteen degrees in the forward direction from normal to the point of the surface nearest the torch.

Under the control of the programmed computer, the motion controller typically moves the torch to a starting position within the cavity of the piece, which has not yet been started rotating. (As with all the positioning moves discussed herein, the positioning is a relative one between the torch and the piece, and any of these moves may be implemented by moving the torch, moving the body, or both.) The starting position is determined by the geometry of the piece, inner surface and cavity, and may be at the tip or center of the cavity, although in some applications the very center of the cavity does not need to be vitrified, and the starting position may be found further out and/or up on the inner surface. Once in the starting position, the torch and the piece are held stationary for initial dwell period (410), which is a short period of time, typically a few seconds, while an initial viscous zone develops on the inner surface. At the end of the initial dwell period, the piece is set into rotation while the torch is held in a fixed position along the axis of rotation, and the piece is put through one full rotation at a fixed angular velocity for initial flat pass (412) to extend the initial viscous zone into an initial viscous and then vitrified band.

Upon completion of the initial flat pass, the piece continues in rotation while the torch begins to translate up along the axis of rotation, and the first helical rastering scan (414) begins, with the translation of the torch along the axis of rotation and the rotation of the piece each contributing a component of the helical rastering motion.

Typically the torch maintains an approximately constant linear motion upward along the axis of rotation as rotation of the piece and resultant helical scanning continues. The helical raster may cover the entire cavity, or only a portion of the cavity if different torches are used for different sections of the cavity. When the torch comes to the end of the section to be covered, the translation of the torch along the axis of rotation may be halted while the piece continues rotating, for a final flat pass (416) through either a full rotation of the piece or that portion of the piece's circumference necessary to complete the pass, producing a final flat band of vitrification. The torch is then withdrawn from the piece and the kiln and extinguished (418).

As the torch moves toward the aft end of the concave surface, the diameter of the cavity along the radial axis typically expands, and the "cone angle" of the surface, which is the tangent of the nearest point of the inner surface in the side-view plane defined by the axis of rotation and the radial axis, typically turns toward running parallel with the axis of rotation. The torch motion program typically compensates for these changes in the cavity's geometry by commanding the motion controller to translate the torch out along the radial axis to maintain a constant standoff distance from the piece's surface, and by commanding the motion controller to rotate the torch around the tangential axis toward being normal to the axis of rotation in the side-view plane. In addition, the rotational velocity of the piece is typically slowed as the torch moves into larger-diameter portions of the cavity, to compensate for convective and radiant heat loss from the larger cavity and increased circumferential distance between the overlaps of successive passes of the torch.

In situations where the bottom of the interior cavity is flat, rather than translating the torch upward along the axis of rotation, typically the motion controller translates the torch outward along the radial axis to create a spiral along the flat bottom. When a rising portion of the inner surface is encountered at the outer edge of the flat bottom, the torch begins translation upward along the axis of rotation to extend the flat spiral into a helix. Due to the angle of the necessary heat application, it may be necessary to use a specially angled torch head for vitrifying a flat bottom surface.

Typically multiple torches are used for processing the piece, or perhaps one torch for the entire cavity and one torch for the aft edge. During a torch change, the kiln cover featuring an opening is removed and the kiln cover without an opening is replaced on the kiln (or the no-opening cover is stacked on top of the cover with opening), and the piece is reheated (420). When the reheat cycle is complete, the second torch is attached in a single-torch-attachment system, or activated in a multi-torch-attachment system, and ignited (422). The kiln cover with opening is once again brought to bear, and the torch movement program begins (424). As with the first torch, the second torch is put through an initial dwell period and initial flat pass (426), and then scanned through its helical rastering (428), then moved through a final flat pass, and the second torch is retracted and extinguished (430).

As many additional iterations (432, 434) of the reheat and rastering cycle as necessary for completing the processing of the full piece may be employed. For example, as depicted in FIG. 1B, three different zones, 128, 130, and 132, of a conical piece are each processed with a different torch, and in addition a portion 134 of that piece is not vitrified. A similar iteration of reheating and torch movement may be employed for vitrifying the aft edge, lip, or other adjacent surface of the piece. Typically the width of this edge or lip is smaller than the length of the torch flame, and so the torch movement is limited to an initial positioning followed by a single full rotation of the piece; however if the edge or lip is thicker than the flame width, a spiral pattern produced by piece rotation and radial torch translation may be performed.

When torch vitrification processing of the piece is complete, the piece is cooled to room temperature (436). The piece may be allowed to cool in open air, and should not experience dunting if the vitrified layer has been properly constructed.

To relieve thermal stress that may remain in the part after vitrification, the piece may be annealed (438). This may be done in the same kiln that was used for the vitrification, or in a separate oven. Such annealing is typically performed by heating the piece at a rate of 20° C. to 30° C. per minute to a temperature of about 1175° C., soaking the piece in that temperature for fifteen to thirty minutes, and then cooling the piece at a rate of 20° C. to 30° C. per minute back down to room temperature. Non-destructive final inspection of the processed piece (440) may be performed, including for example visual inspection, leak testing, and thickness measurements. The difference in the piece's wall thickness before and after processing may be used to determine empirically the degree of vitrification and thickness of the vitrified layer, for example through comparison to wall thicknesses determined from destructive testing of certain reference pieces, without the need for destructive testing of the production pieces. Layer density statistics can also be determined using fluid-tank displacement measurements. Such measurements can be calibrated to the facts that fused silica is typically around 92% dense, whereas a fully vitrified layer is almost 100% dense, and the transitional layer between the vitrified layer and the rest of the piece may assume density values transitioning between these two.

Although limited embodiments of the present invention have been specifically described and illustrated, many modifications, combinations, and variations will be apparent to those skilled in the art. Accordingly, it is to be understood that an apparatus constructed according to the principles of this invention and the methods for operating such apparatus may be embodied other than as specifically described herein. The invention is also defined in the following claims.

What is claimed is:

1. An apparatus for vitrifying at least a portion of an inner surface of a fused silica body, the apparatus comprising:
   a turntable configured to rotate the fused silica body about a first longitudinal axis;
   a local area heat source comprising a boom defining a second longitudinal axis and a torch head coupled to a distal end of the boom, the local area heat source configured to apply heat to the at least a portion of the inner surface, the heat having a temperature sufficient to vitrify the portion of the inner surface;
   at least one positioning mechanism coupled to a proximal end of the boom of the local area heat source; and
   a controller coupled to the at least one positioning mechanism to command movement of the at least one positioning mechanism, wherein:
   the at least one positioning mechanism is configured to translate the local area heat source in a direction parallel to the first longitudinal axis,
   the at least one positioning mechanism is configured to translate the local area heat source along a radial axis orthogonal to the longitudinal axis to maintain a constant standoff distance between the torch head of the local area heat source and the portion of the inner surface as the local area heat source translates in the direction parallel to the longitudinal axis,
   the at least one positioning mechanism is configured to rotate the local area heat source about a tangential axis orthogonal to both the longitudinal axis and the radial axis to maintain the local area heat source perpendicular to the portion of the inner surface in a plane defined by the radial axis and the longitudinal axis as the local area heat source translates in the direction parallel to the longitudinal axis, and the at least one positioning mechanism is configured to rotate the local area heat source about the second longitudinal axis such that the torch head of the local area heat source is canted toward an approaching portion of the inner surface and the torch head of the local area heat source defines an obtuse angle relative to the portion of the inner surface in a plane defined by the radial axis and the tangential axis.

2. The apparatus of claim 1, wherein the turntable is configured to vary a rate about which the turntable rotates the fused silica body about the longitudinal axis.

3. The apparatus of claim 1, wherein the heat source comprises a plurality of torches, and wherein the at least one positioning mechanism is configured to position each of the plurality of torches to vitrify different portions of the inner surface of the fused silica body.

4. The apparatus of claim 1, wherein the local area heat source is a surface mix, low-velocity, oxygen-hydrogen fueled torch.

5. The apparatus of claim 4, wherein the torch comprises quartz glass.

6. The apparatus of claim 4, wherein the torch is a linear torch comprising an opening having a width and a length longer than the width, and wherein the length is transverse to a direction of rotation about the longitudinal axis.

7. The apparatus of claim 4, further comprising:
a fuel supply configured to supply fuel to the torch; and
a mass flow controller disposed between the fuel supply and the torch, wherein the mass flow controller is configured to regulate a flow rate from the fuel supply to the torch.

8. The apparatus of claim 1, wherein the at least one positioning mechanism is a CNC motion controller, and wherein the CNC motion controller is configured to move the heat source with respect to the inner surface in a predefined manner.

9. The apparatus of claim 1, further comprising an oven configured to anneal the fused silica body.

10. An apparatus for vitrifying at least a portion of an inner surface of a fused silica body, the apparatus comprising:
a turntable configured to rotate the fused silica body about a longitudinal axis;
a local area heat source configured to apply heat to the at least a portion of the inner surface, the heat having a temperature sufficient to vitrify the portion of the inner surface;
a kiln configured to receive the fused silica body, wherein the kiln is configured to bias heat the fused silica body to a temperature lower than the temperature sufficient to vitrify the portion of the inner surface and higher than room temperature;
at least one positioning mechanism coupled to the local area heat source; and
a controller coupled to the at least one positioning mechanism to command movement of the at least one positioning mechanism, wherein:
the at least one positioning mechanism is configured to translate the local area heat source in a direction parallel to the longitudinal axis,
the at least one positioning mechanism is configured to translate the local area heat source along a radial axis orthogonal to the longitudinal axis to maintain a constant standoff distance between the local area heat source and the portion of the inner surface as the local area heat source translates in the direction parallel to the longitudinal axis, and
the at least one positioning mechanism is configured to rotate the local area heat source about a tangential axis orthogonal to both the longitudinal axis and the radial axis to maintain the local area heat source perpendicular to the portion of the inner surface in a plane defined by the radial axis and the longitudinal axis as the local area heat source translates in the direction parallel to the longitudinal axis.

11. The apparatus of claim 10, wherein the kiln is rotatably supported on the turntable.

12. The apparatus of claim 10, further comprising a removable kiln cover having an opening configured to accept the local area heat source.

* * * * *